(12) United States Patent
Kwok et al.

(10) Patent No.: US 8,505,703 B2
(45) Date of Patent: Aug. 13, 2013

(54) ECCENTRIC GEARING TYPE CLUTCH

(75) Inventors: Yau Cheung Kwok, Hong Kong (CN);
Lai Yin Johnson Li, Hong Kong (CN)

(73) Assignee: Lai Yin Johnson Li, N.T. (HK)

( * ) Notice: Subject to any disclaimer, the term of this patent is extended or adjusted under 35 U.S.C. 154(b) by 437 days.

(21) Appl. No.: 12/922,733

(22) PCT Filed: Mar. 17, 2009

(86) PCT No.: PCT/CN2009/070820
§ 371 (c)(1),
(2), (4) Date: Sep. 15, 2010

(87) PCT Pub. No.: WO2009/115031
PCT Pub. Date: Sep. 24, 2009

(65) Prior Publication Data
US 2011/0005218 A1    Jan. 13, 2011

(30) Foreign Application Priority Data
Mar. 19, 2008 (CN) .......................... 2008 1 0084693

(51) Int. Cl.
*F16D 31/02* (2006.01)
*F16D 31/06* (2006.01)

(52) U.S. Cl.
USPC .............. 192/58.91; 418/221; 418/241

(58) Field of Classification Search
USPC ................ 192/58.9–58.92; 33/58.9–58.92
See application file for complete search history.

(56) References Cited

U.S. PATENT DOCUMENTS

| | | | | |
|---|---|---|---|---|
| 2,386,459 A | * | 10/1945 | Hautzenroeder | ............... 192/60 |
| 3,049,207 A | * | 8/1962 | Maier | ........................ 192/58.91 |
| 3,974,900 A | | 8/1976 | Park | |
| 4,924,989 A | | 5/1990 | Filderman | |

FOREIGN PATENT DOCUMENTS

| | | |
|---|---|---|
| CN | 1078778 A | 11/1993 |
| CN | 1142579 A | 2/1997 |
| CN | 2616754 Y | 5/2004 |
| CN | 100337048 C | 9/2007 |
| GB | 602586 A | 5/1948 |
| JP | 3-047491 A | 2/1991 |
| WO | WO-9313301 A1 | 7/1993 |

\* cited by examiner

*Primary Examiner* — David D Le
*Assistant Examiner* — Jacob S Scott
(74) *Attorney, Agent, or Firm* — Rabin & Berdo, P.C.

(57) ABSTRACT

An eccentric gearing type clutch includes a housing connected to, and for rotation with, a drive shaft; at least one set of rotors, each set of rotors having two parallelly arranged rotors concentric with the housing and being connected to, and for rotation with, a driven shaft; at least one set of cylinder rings cooperating with respective rotors, each set of cylinder rings having two cylinder rings arranged in parallel and located between the housing and respective rotors, and being capable of upward and downward displacement inside the housing, the two cylinder rings being separated by a separator plate; a vane movably arranged in a slot in each rotor; and a joint control mechanism for controlling upward and downward displacement of the two cylinder rings, wherein space inside the housing is filled with an operation oil and sealed. Reduced frictional wear provides improved clutch performance, enhanced lifespan and braking accuracy.

24 Claims, 4 Drawing Sheets

C-C

C-C

B-B

A-A

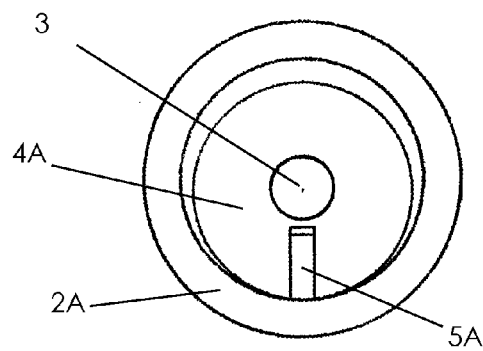
Fig. 4.1a
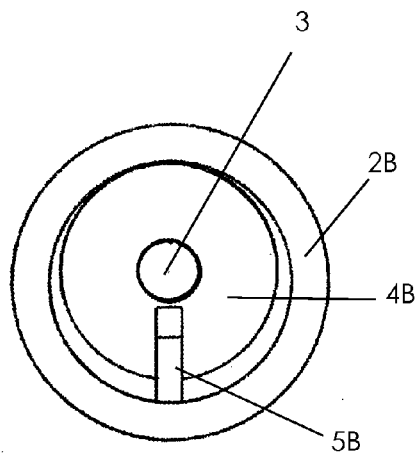
Fig. 4.1b
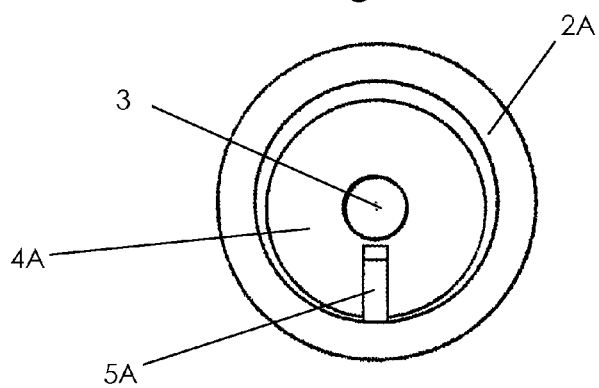
Fig. 4.2a
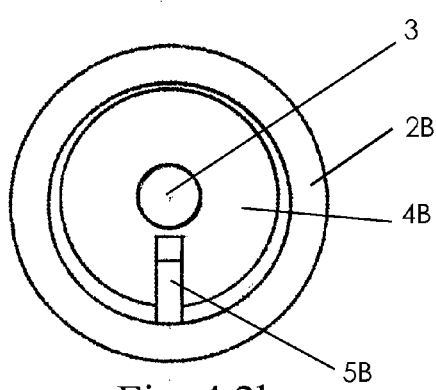
Fig. 4.2b
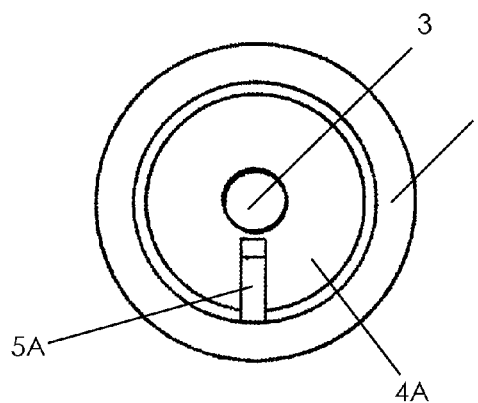
Fig. 4.3a
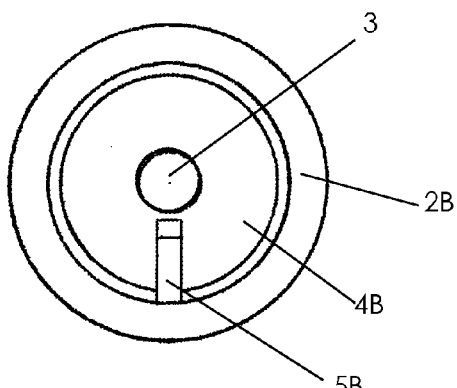
Fig. 4.3b

D-D

E-E

ECCENTRIC GEARING TYPE CLUTCH

BACKGROUND OF THE INVENTION

1. Field of the Invention

The present invention relates to a clutch in a mechanical driving device, and more particularly, to an eccentric gearing type clutch for power transmission by taking advantage of the eccentric principle.

2. Background of the Related Art

A clutch is widely used in a mechanical driveline for power transmission, more particularly in automobiles utilizing an internal combustion engine, and it is mainly used to transmit the power from a driving machine to a driven machine for convenient manipulation of the driven machine. In the entire driving system of an automobile, as one of the main parts thereof, the clutch is arranged at the front end and used frequently during the driving of the automobile.

The existing clutches include gear clutches, friction clutches, hydraulic clutches, electromagnetic clutches, and the like.

A conventional friction clutch operates based on friction, the heat generated during frequent usage leads to the rise in temperature of the pressure plate, flywheel and other components of the clutch, which accelerates wear out of the friction disc and shortens the lifespan of the clutch, such that the heat dissipation of the entire clutch needs to be improved. Further, the braking of the friction clutch is not precise; among other things, an instant braking of a large machine could hardly be implemented.

An existing hydraulic clutch transmits torque via an operation oil (fluid oil), the housing of the clutch is integrated with the pump wheel as a drive member; in contrast, the turbine is a driven member; when the rotation speed of the pump wheel is relatively slow, the turbine will not be driven, such that the drive member and driven member are in a disengaged state; as the rotation speed of the pump wheel increases, the turbine will be driven and the drive member and driven member are in an engaged state. The braking performance of such a machine utilizing the pump wheel and turbine for power transmission is also not precise, and the loading capacity of the machine is limited.

An electromagnetic clutch is a clutch that is engaged and disengaged by powering on and off an electric coil. By putting some magnetic powders between the drive member and driven member, the engagement force will be enhanced, and such a clutch is called a magnetic particle clutch, which is relatively high in energy consumption and manufacturing cost, uneconomical, and could not be promoted and used extensively.

In recent years, new attempts have been made to improve clutches. For example, PRC patent ZL200510119050.2 discloses a pump type hydraulic clutch, which adopts an inner gearing of a pinion and a large gear ring. The pinion is coaxially rotatably connected in the housing, a crescent separator board is arranged in the pinion and the large gear ring, in such a manner that a high pressure oil cavity and a low pressure oil cavity are respectively formed between the pinion, large gear ring, crescent separator board and housing. An operation oil is filled into the high pressure oil passage and low pressure oil passage via oil inlets, and the engagement and disengagement operations are controlled by pressure valves connected with respective oil passages. Although the clutch of this PRC patent is an improvement to conventional clutches and has the advantages of being high in transmission efficiency, small in volume, low in manufacturing cost, and so on, however, as it transmits power via gear engagement, the frictional force between the gears will lead to the wear out of various degrees, which affects the surface quality of the gears and shortens the lifespan of the entire clutch.

U.S. Pat. No. 3,974,900 discloses a rotary displacement mechanical coupling device, which also utilizes gear engagement for power transmission thereby having also the foregoing defects.

U.S. Pat. No. 4,924,989 discloses an automatic clutch control system for coupling two rotating shafts, which also utilizes gear in control of the rotation torque, wherein it comprises a friction disc, a pinion and the like, whereby the defects as those in the prior art unavoidably exist.

In view of the various defects in the foregoing clutches, there is a need for a new type of clutch which is safe and stable in operation, good in brake performance, long in lifespan, free of surface wear, simple in configuration, and low in power consumption.

An object of the present invention is to overcome the above defects by providing an eccentric gearing type clutch which is long in lifespan, simple in manipulation, good in reliability, capable of instant braking, and excellent in heat dissipation.

SUMMARY OF THE INVENTION

In order to achieve the above object, the present invention provides an eccentric gearing type clutch, which comprises a housing connected to, and for rotation with, a drive shaft; at least one set of rotors, each of which having two parallelly arranged rotors concentric with the housing, the rotors being in rotatable connection with a driven shaft; at least one set of cylinder rings in cooperation with the rotors, each of which having two parallelly arranged cylinder rings located between the housing and the rotors and capable of upward and downward displacement inside the housing, the two cylinder rings being separated by a separator plate; a vane movably arranged in a slot in each of the rotors; and a joint control mechanism for controlling the upward and downward displacement of the two cylinder rings; wherein space inside the housing is filled with an operation oil and sealed.

As a variation of the eccentric gearing type clutch, an eccentric gearing type clutch having a different configuration is provided, which comprises a housing connected to, and for rotation with, a drive shaft; a rotor concentric with the housing and in rotatable connection with a driven shaft; an eccentric cylinder ring eccentricly and firmly connected with the housing; a thrust hoop concentric with the eccentric cylinder ring and rotatable with respect to the eccentric cylinder ring; at least three plungers equally and movably arranged in a respective slot of the rotor; a control valve coaxially arranged in the rotor and axially movable in the rotor; wherein space inside the housing is filled with an operation oil and sealed.

The plunger herein refers to an element capable of blocking the operation oil, which can be in the form of a cube, a column and any other form adapted to the present invention.

In the design of the present invention, the entire clutch is in a sealed form and full of an operation oil, and the entire oil storage system is in a state of dynamic equilibrium. In one embodiment of the present invention, the housing is devised to be concentric with the rotor and rotates with the drive shaft, and the driven shaft is forced to rotate by the pushing and pulling forces generated under the effect of hydraulic pressure. The cylinder ring is arranged between the rotor and the housing, and the cylinder ring could move up and down for the purpose of eccentric adjustment. The cylinder ring has a rotor having a slot, and a vane in rectangular form is located in the slot; when the cylinder ring moves up and down, the vane is also moved in the slot of the rotor, which serves to communicate or block the operation oil at both sides of the vane; a small trough is arranged at one side of the slot, and a T-shaped conduit is arranged inside the vane, when necessary, the conduit enables the operation oil to link up with the slot in the rotor through the small trough, but this will only effect unidirectional rotation. As an alternative, small troughs could be arranged at two sides of the plunger, and a ball could be arranged inside the transverse portion of the T-shaped conduit, once the compression state occurs, the ball could block the flow of the operation oil, such that a bi-directional rotation is realized.

In the running process of a cylinder ring, there always exists a point of the highest power efficiency and a point of the lowest power efficiency, in order to improve that, it requires the arrangement of at least one set of cylinder rings and rotors in the housing for complementary adjustments. There could coexist a multiple of sets according to the site of application and the magnitude of the power. Each set shall include even-numbered cylinder rings, or two cylinder rings in general speaking. When there is only one set of cylinder rings, the adjustment of the cylinder rings is realized with a rocker arm passing through the cylinder rings and a cooperating axle housing. The rocker arm links up two cylinder rings with a separator board there between, which can acts as a fulcrum by which the rocker arm can move up and down; when the axle housing effects axial movement, the rocker arm moves cooperatively with the axle housing by means of a movable lever, whereby the cylinder rings could produce correspondingly a desired eccentric distance. Further, apart from acting as the fulcrum, the two cylinder rings connected by the rocker arm may also compensate the synchronized back and forth locomotion in a cyclic operation of the cylinder rings, such that the operation of the clutch will be more stable, and the manipulation of the clutch will be more easy and smooth, too.

Taking into consideration that the internal pressure of the housing might vary when the operation oil expands or shrinks along with the change of the season and region which the clutch operates in, a synthetic rubber membrane is arranged at one end of the housing for adjusting and balancing the internal and external pressure thereof. The rubber membrane is elastic and could expand or shrink to accommodate the expansion or shrinkage forces from the operation oil, it will transform in a timely and automatic manner so as to minimize the difference between the internal pressure of the housing and the ambient pressure, which further facilitates the sealing of the clutch.

During the running process of the clutch, the leakage of operation oil of the cylinder rings and rotors might occasionally occurs which lead to the malfunction of the clutch. To this end, a buffer oil passage formed with a plurality of interconnected conduits is arranged inside the housing (excluding the interior of the adjustable cylinder rings and rotors), the conduits are interconnected, once a leakage occurs, the buffer oil passage will play the role of compensating the leakage so as to restore the amount of oil to an effective amount in the normal working state, and the clutch filled with the operation oil will also be able to restore an equilibrium state thereof, and the optimum performance of the clutch will be attained again.

In another configuration, an eccentric cylinder ring eccentricly and firmly connected with the housing is employed, and a thrust hoop concentric with the eccentric cylinder ring is used for power and torque transmission. In the housing, at least 3 plungers are radially arranged in the rotor in a equal distance, and the above object is realized by controlling the motion of the plungers. In this configuration, when the eccentric cylinder ring rotates, a corresponding plunger will effect a reciprocating movement. When the axle housing connected with the control valve effects axial movement, the inflow and outflow rates of the operation oil will vary with generation of different expansion and shrinkage forces, such that the eccentric cylinder ring will effect synchronous or desired rotation while transmitting the power to the thrust hoop (including the plungers and rotors).

The eccentric gearing type clutch of the present invention makes a breakthrough to the prior art. The invention adapts the eccentric principle to a clutch with an unique eccentric gearing configuration whereby obtaining excellent braking, deceleration, engaging and disengaging performances. By employing a hydraulic pressure approach, the present invention features a timely and precisely braking operation with a high accuracy and enables an excellent heat dissipation of the overall system as the generated heat could be absorbed properly by a fluid thereof. During a continuous engaging and disengaging operation, there occurs no wear out as in conventional friction cluthes caused by the prolonged engaging and disengaging operation of the pressure plates thereof, such that the performance will not be gradually degraded due to friction and abrasion, and the lifespan and reliability in running state thereof will be enhanced; as the present invention being independent to the friction plate, the manipulation of the engaging and disengaging operation of the clutch could always be carried out smoothly such that the operation of the machine will be more stable and unhindered, thus satisfying requirement of various degrees. The present invention also possesses the advantages of being noise free in operation, high in efficiency and so on, which could be extensively promoted and adopted.

BRIEF DESCRIPTION OF THE DRAWING

The present invention will be described in details with reference to specific embodiments and the accompanying drawings.

FIG. 4.1a is a schematic view of the rotor 4A of the eccentric gearing type clutch of the first embodiment of the present invention which is at a point of lowest power efficiency in a fully engaged state;

FIG. 4.1b is a schematic view of the rotor 4B of the eccentric gearing type clutch of the first embodiment of the present invention which is at a point of highest power efficiency in a fully engaged state;

FIG. 4.2a is a schematic view of the rotor 4A of the eccentric gearing type clutch of the first embodiment of the present invention which is at a point of lowest power efficiency in an intermediate state;

FIG. 4.2b is a schematic view of the rotor 4B of the eccentric gearing type clutch of the first embodiment of the present invention which is at a point of highest power efficiency in an intermediate state;

FIG. 4.3a is a schematic view of the rotor 4A in a fully disengaged state of the eccentric gearing type clutch of the first embodiment of the present invention;

FIG. 4.3b is a schematic view of the rotor 4B in a fully disengaged state of the eccentric gearing type clutch of the first embodiment of the present invention;

Figure 3:
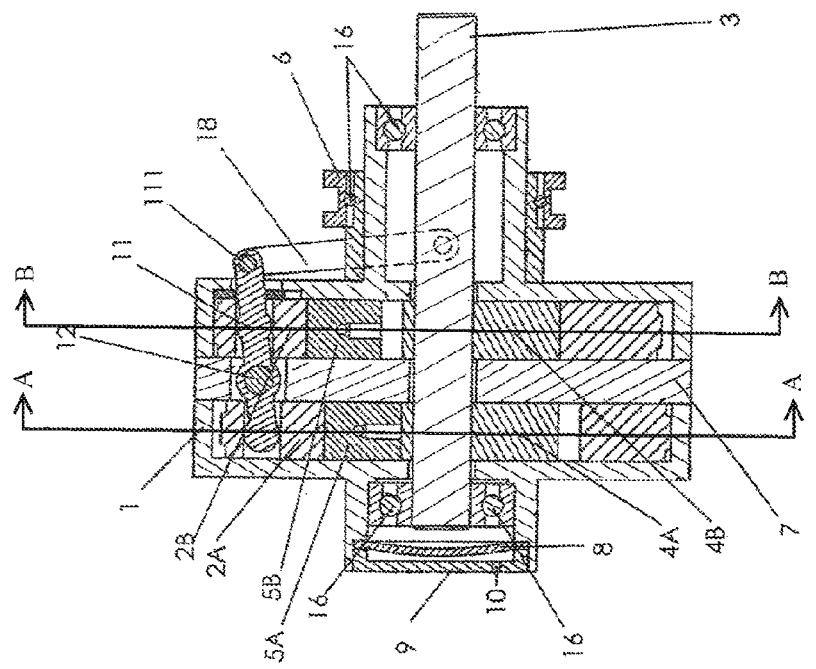
FIG. 3 is a longitudinal sectional view of an eccentric gearing type clutch formed by combining FIG. 1 with FIG. 2, which is taken along line C-C of Fig.

The reference numbers indicated in the drawings are listed as follows.

| | |
|---|---|
| 1, 21: housings | 2A, 2B: cylinder rings |
| 3, 30: driven shafts | 4A, 4B, 27: rotors |
| 5A, 5B: vanes | 6, 28: axle housings |
| 7: separator plate | 8, 31: rubber membranes |
| 9, 33: protecting covers | 10, 32: through holes |
| 11: rocker arm | 12: fulcrum |
| 13: small trough | 14: ball |
| 15: buffer oil passage | 16: bearing |
| 17: opening | 18: control lever |
| 22: eccentric cylinder ring | 23: thrust hoop |
| 24: plunger | 26: control valve |
| 25: sliding shoe | 251: sliding shoe ball |
| 29: jogger | 111: movable articulation point |
| 34: ball value | 35: bearing |
| 241: plunger cavity | |

DETAILED DESCRIPTION OF THE INVENTION

Embodiment 1

Figure 2:
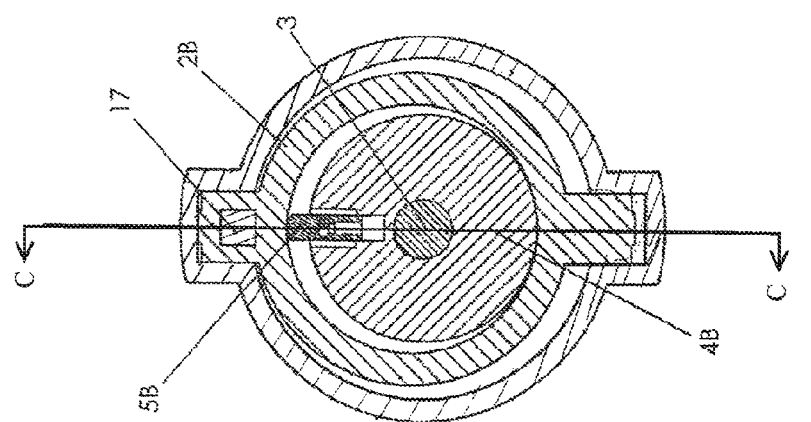
FIG. 2 is a transverse sectional view of a mechanism having a rotor 4B in an eccentric gearing type clutch of a first embodiment of the present invention, which is taken along line B-B of FIG. 3.
Figure 1:
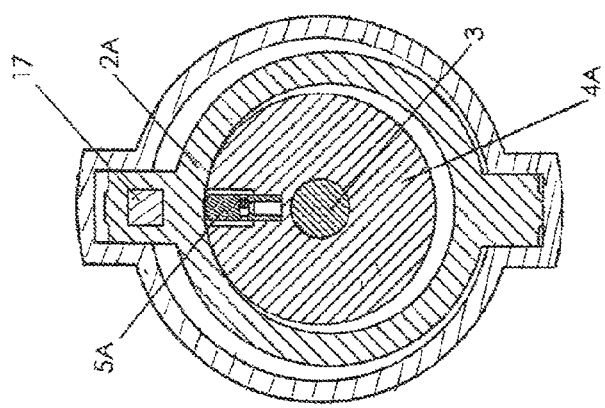
FIG. 1 is a transverse sectional view of a mechanism having a rotor 4A in an eccentric gearing type clutch of a first embodiment of the present invention, which is taken along line A-A of FIG. 3.

As shown in FIGS. 1-3, an eccentric gearing type clutch of the present invention comprises a fully sealed housing 1 in which an operation oil is filled, the housing 1 is connected with a drive shaft (not shown) by which the housing can be rotated together therewith. Inside the housing there is provided with one set of rotors formed with two parallelly arranged rotors 4A and 4B concentric with the housing, wherein the rotors 4A and 4B are connected with a driven shaft 3, under the action of force, the driven shaft 3 is rotated by the rotors. The clutch further comprises one set of cylinder rings in cooperation with the rotors, each set has two parallelly arranged cylinder rings 2A and 2B located between the housing 1 and the rotors, and capable of relative displacement in up and down directions inside the housing 1, the eccentric configuration of the rotors and cylinder rings is altered by manipulating the motion of the cylinder rings, such that a mechanism effects eccentric motion is formed. The two parallel cylinder rings are separated by a parallel separator plate 7 or the like, and the separator plate 7 is firmly connected with the housing 1. In each of the rotors a slot is preset and the size of the slot can be determined as desired with reference to the location in which the clutch is employed. In the slot vanes 5A and 5B are arranged, which could move up and down inside the slot, on one hand, the vanes could be in full contact with the cylinder rings, and on the other hand, they could be retracted into the slot, wherein the curvature radius of one side of the vanes in contact with the cylinder ring is smaller than that of the cylinder ring.

Figure 5:
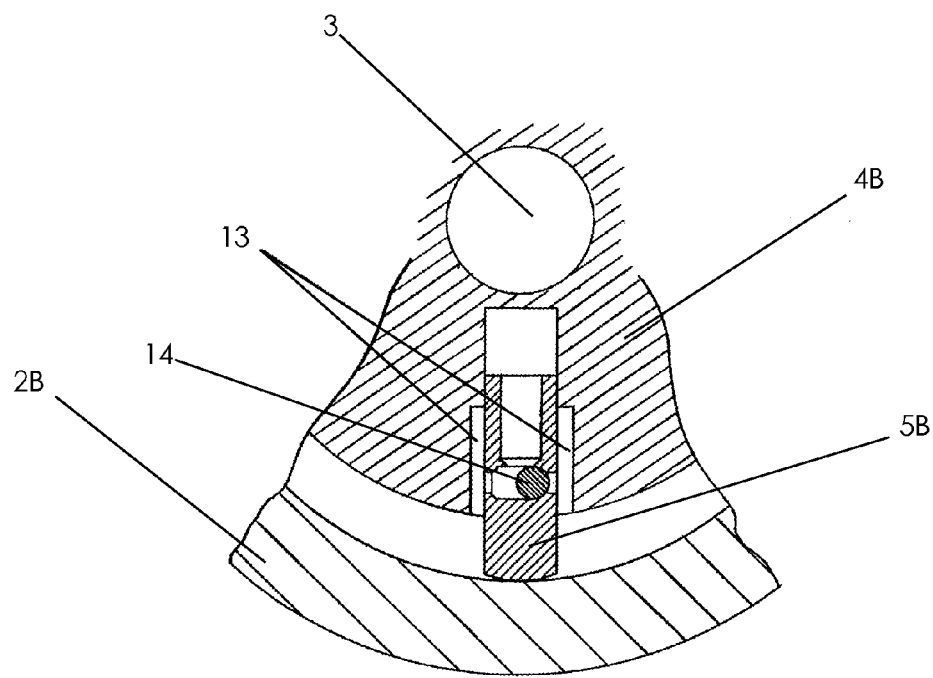
FIG. 5 is a structural representation of a vane in the first embodiment.

As shown in FIG. 5, a T-shaped conduit is arranged in the vane 5B, and a small trough 13 is arranged at either side or both sides of the vane, such that the T-shaped conduit allows the small trough 13 to communicate with the retractable portions of the vane and thus the operation oil could flow into and flow out the slot of the rotor. The vane 5A is of the same configuration as the vane 5B, wherein a small trough 13 arranged at one side of the vane only allows for rotation of the rotor in one way, while two way rotation of the clutch could be effected by arranging small troughs 13 at two sides of the vane. In the present invention, the small troughs 13 will be arranged at two sides for completeness of function whereby it could be adapted to various working conditions. In the transverse portion of the T-shaped conduit a ball 14, such as a steel ball, is arranged, which ball could move back and forth in the transverse portion for selective blocking of the operation oil, when the ball is pressed to one end of the transverse portion, it will prevent the operation oil from flowing through the end, while the operation oil flowed through the other end will enter into the slot via the small trough 13. Manipulation of a set of cylinder rings requires a joint control mechanism comprising a rocker arm 11, which is inserted into an opening 17 preset in one end of the cylinder ring, a fulcrum 12 on the rocker arm 11 which could be located selectively on the separator plate 7; and a control lever 18 movably connected with the rocker arm 11 via a movable articulation point 111, and the control lever 18 being connected with an axle housing 6 arranged on the housing 1. In this embodiment, the axle housing 6 is fixed with a bearing 16, and the control lever 18 is connected with the axle housing 6 in a cross joint manner (not shown), such that the axle housing 6 could effect axial movement while the driven shaft 3 and the housing 1 rotate. When the axle housing 6 effects the axial movement, the control lever 18 forces the rocker arm 11 to move up and down, whereby the cylinder rings are driven, a different eccentric center is formed and the object of the present invention is realized. In the clutches of the present invention, all clutch shafts are fixed with bearings 16.

When the clutch is used in a different condition, the state of the operation oil will be varied. For example, the operation oil will expand in summer and shrink in winter. It will be the same case as the operation oil being used in southern and northern region of the country. Further, the operation oil will generate heat in the working state, which makes the internal pressure of the housing 1 to change, such that there is a need of an elastic member for adjusting the internal and external pressure thereof, and the elastic member might be any resilient object. In the invention, an elastic synthetic rubber membrane 8 is employed which could tolerate the change of pressure. In addition, a protecting cover 9 having a through hole 10 is further arranged outside the rubber membrane for the protection of the rubber membrane. When the interior of the housing expands, the rubber membrane will protrude outwardly; and it will protrude inwardly when the interior of the housing shrinks. By the arrangement of the rubber membrane, the difference between the internal pressure of the housing and the ambient pressure is reduced, which promotes the sealing feature of the clutch.

Figure 6:
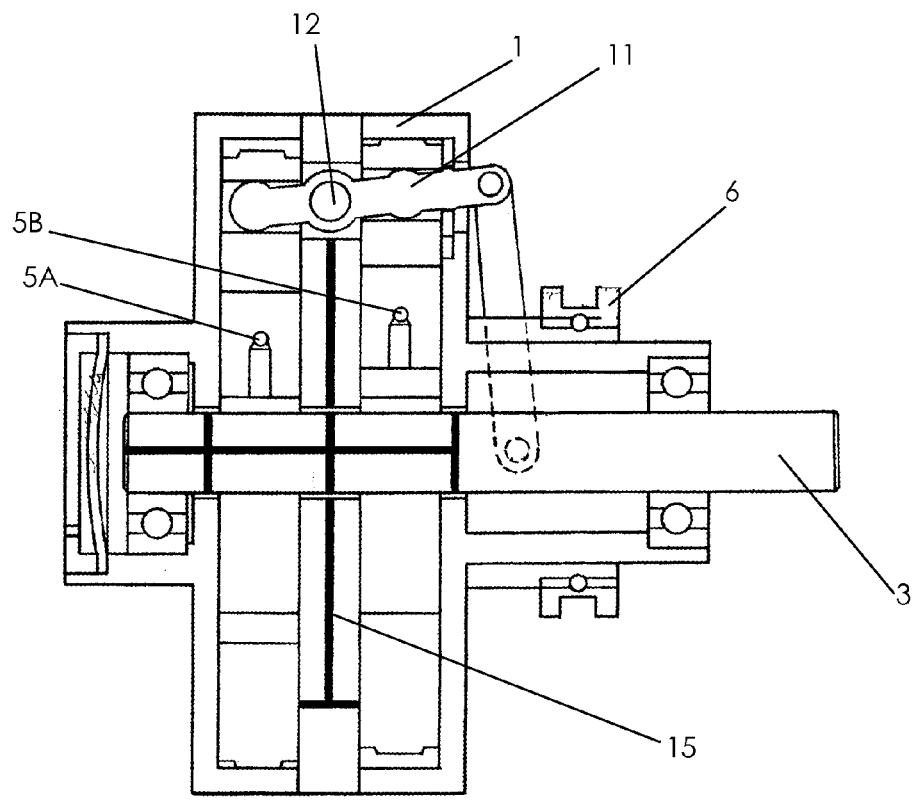
FIG. 6 is a schematic view of a buffer oil passage of the clutch in the first embodiment.

As shown in FIG. 6, when a leakage of the operation oil occurs between the rotors and the cylinder rings, the operation of the clutch will be affected. To this end, in the housing a plurality of buffer oil passages 15 are arranged at locations which have not been occupied by the cylinder rings and rotors, and the buffer oil passages are distributed in such a way that the oil could interflow among them. Once the leakage occurs, the operation oil in the entire housing would restore to an evenly distributed state by virtue of the existence of the buffer oil passages 15, which protect the clutch from malfunctioning and breaking.

It should be noted that the so called "one set" of the present invention may comprise 2, 4 or any other even-numbered cylinder rings and rotors. In view of the practical site of application, production cost, difficulty in manufacturing and accuracy requirement thereof, the term "one set" of the present embodiment refers to 2. Further, the entire clutch is fully sealed and filled with the operation oil, and the clutch does not undergo any inflow or outflow of the operation oil.

The processes during which various engaged and disengaged states occur in the working state will be described herein below (with reference to a single mechanism) with reference to the drawings:

1. A Fully Engaged State.

As shown in FIG. 4.1b, after adjusting manually the eccentric distance between the cylinder ring 2B and rotor 4B to a maximum value, the rotor 4B will be in intimate contact with the cylinder ring 2B, such that the operation oil could not communicate with the contact position of the rotor and the cylinder ring. When the drive shaft (not shown) drives the housing 1 to effect counterclockwise rotation (view from a direction entering into the paper), the cylinder ring 2B will be driven by the housing 1 and rotate in the same direction, such that the space on the left of the rotor 4B and vane 5B will be reduced, a compression zone is formed and a pushing force is generated; while an expansion zone is formed on the opposite side and a pulling force is generated.

Referring to FIG. 5, as the operation oil between the rotor and cylinder ring flows through the small trough 13 on the left and pushes the ball 14 to the end on the right, and the operation oil produces a locking force in the T-shaped conduit and the retractable portion of the vane, together with the effect of the centrifugal force due to rotation of the vane 5B and continual outward expansion of a spring (not shown) between the retractable portion and the vane 5B, such that the vane 5B is in intimate contact with the cylinder ring, and the operation oil could not interflow due to the blockage of the vane 5B, and thus, the vane 5B is subject to the pushing force generated in the compression zone, while the vane 5B is subject to the pulling force generated in the expansion zone, which makes the rotor and the cylinder ring to effect synchronous rotation, at this point they are in the fully engaged state and could drive a load thereof.

In FIG. 4.1a, the cylinder ring 2A and the rotor 4A (together with the position of the vane) illustrates a configuration at a point of the lowest power efficiency. Similarly, FIG. 4.1b illustrates a configuration at a point of the highest power efficiency.

2. An Intermediate State (Between the Engaging and Disengaging States) of the Clutch.

As shown in FIG. 4.2b, the eccentric distance between the cylinder ring 2B and the rotor 4B needs to be adjusted if a deceleration is desired. By the adjustment of the eccentric distance, the intimate contact zone of the cylinder ring 2B and rotor 4B will be altered, and the operation oil could flow between the compression zone and the expansion zone in a restricted manner, which leads to a variety of flow rates and different magnitudes of pushing and pulling forces, such that the rotor 4B and the cylinder ring 2B will effect non-synchronous rotation, and the desired speed to be maintained by the clutch is realized. At this time, the clutch is in the intermediate state. Similarly, FIG. 4.2a illustrates another rotor amid the intermediate state.

3. A Fully Disengaged State.

As shown in FIG. 4.3b, after adjusting the distance between the cylinder ring 2B and the rotor 4B and making them to be spaced from each other in a equal distance, then the rotor 4B will no longer be in intimate contact with the cylinder ring 2B, such that the flow of the operation oil will not be restricted without the pushing and pulling forces produced from the compression or expansion thereof. In this way, the cylinder ring 2B and rotor 4B are in the fully disengaged state. At this point, the cylinder ring and rotor illustrated in FIG. 4.3a will be spaced from each other in an equal distance and being in the fully disengaged state as illustrated in FIG. 4.3b.

When the ambient conditions change such that the speed of the rotor is surpassed by the housing 1 rotated in the same direction (e.g. clockwise direction), the clutch will cease to be in effect. At this point, as shown in FIG. 5, due to the design of bidirectional feature of the vane 5B, when the space on the left of the rotor and cylinder ring separated by the vane 5B is gradually reduced, it will change from an expanded state into a compressed state. The operation oil inside the compressed space will flow through the small trough 13 on the left and push the ball 14 inside the vane 5B to the end on the other side of the conduit. The operation oil also produce a locking force in the bottom of the retractable portion of the vane 5B, which makes the vane 5B permanently contacts with the cylinder ring, such that the rotor and the cylinder ring could be separated or communicated by the vane 5B, and there is a mutual traction between them, by which the driven shaft will become the drive shaft. The compression and expansion force generated by the operation oil enable the clutch to run properly and maintain persistently the operation of the clutch.

However, in a cycle of an engaging and disengaging process of a clutch with one vane, there exists simultaneously a point of lowest power efficiency and a point of highest power efficiency in a cyclic manner. In order to eliminate such a phenomenon, the clutch of the present invention adopts a configuration having a set of elements, each set comprises even-numbered cylinder rings and rotors and each set is under control of the foregoing joint control mechanism. When the cylinder ring 2A in use migrates from the point of highest power efficiency to the point of lowest power efficiency, the cylinder ring 2B will migrate from the point of lowest power efficiency to the point of highest power efficiency. In this way, the clutch can operate in a much more stable and smooth manner.

As shown in FIG. 3, one end of the control lever 18 is fixed on the axle housing 6. During operation, when the axle housing 6 is controlled to effect axial movement, the rocker arm 11 will be driven by the control lever 18 via the movable articulation point 111 and will move up and down in virtue of the fulcrum 12, such that the eccentric distance of the pair of cylinder rings could be easily adjusted, and the clutch could function in a optimum manner.

Embodiment 2

Figures 7, 8:
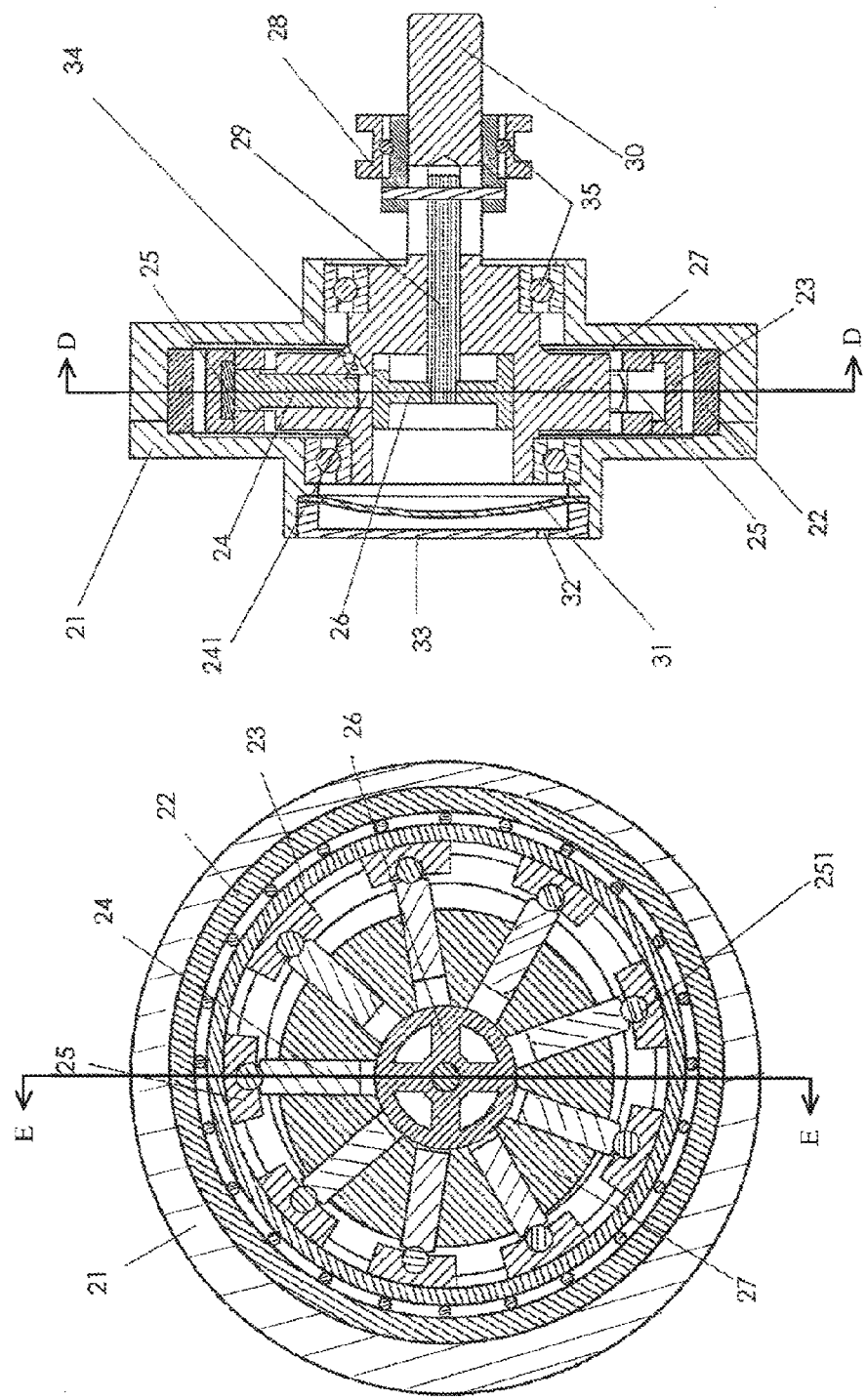
FIG. 7 is a transverse sectional view of a clutch of a second embodiment of the present invention, which is taken along line D-D of FIG. 8.
FIG. 8 is a longitudinal sectional view of a clutch of a second embodiment of the present invention, which is taken along line E-E of FIG. 7.

As shown in FIGS. 7 and 8, a variation of an eccentric gearing type clutch of the present invention comprises a housing 21 in rotatable connection with a drive shaft (not shown); a rotor 27 concentric with the housing 21 and in rotatable connection with a driven shaft 30; an eccentric cylinder ring 22 eccentricly and firmly connected with the housing 21; a thrust hoop 23 concentric with the eccentric cylinder ring 22 and rotatable with respect to the eccentric cylinder ring. At least three plungers 24 are equally arranged in a preset slot of the rotor 27, the plungers 24 being movable in the slot and connected by a control valve 26 which is coaxially and axially movably arranged in the rotor 27. The housing 21 is fully sealed, and the space inside the housing is filled with an operation oil.

In this embodiment, the plunger 24 is connected to the thrust hoop 23 via a sliding shoe ball 251 on a sliding shoe 25.

The control valve 26 is of a barrel shape (referred as the barrel valve 26 herein below), the connection portion of the barrel valve and the bottom of each plunger slot are interconnected, the barrel valve 26 is connected with an axle housing 28 fixed on the driven shaft 30 by means of a jogger 29, such that the axle housing 28 could axially move when the driven shaft 30 rotates. The barrel valve 26 could effect axial movement by controlling the axle housing 28.

Like embodiment 1, an elastic member 31 and a protecting cover 33 of the elastic member 31 having a through hole 32 are arranged at one side of the housing 21 for adjusting and balancing internal and external pressure of the clutch. The fixed structure of the entire clutch is mounted with bearing 35. It should be noted that the number of the plungers 24 could be adjusted as required, but there should be at least three of them, the more of the plungers 24, the more stable the system is, however, the manufacturing cost, technology and accuracy requirements of the plunger 24 and the control valve 26 will be correspondingly boosted. In general, three to nine plungers are advantageous, and preferably, the number of plungers of this embodiment is nine.

Referring again to FIG. 8, the engaging and disengaging function of the clutch is realized by changing the flow of the operation oil while altering the back and forth motion of the plungers 24. At the end of the plunger 24, the operation oil flows in and out gradually, which means the operation oil is sucked in to and flow out from the barrel valve 26 (if a V-shaped notch is arranged in the barrel valve 26 at a position corresponding to each of the plunger for the sucking in and flowing out of the operation oil, the control of the progressive in and out of the operation oil will be enhanced by changing the axial movement of the barrel valve 26). As different flow rates lead to different compression and expansion forces, the eccentric cylinder ring 22 might effect synchronous or desired rotation while transmitting power to the thrust hoop 23.

The specific operation is realized as follows: seal the entire clutch and fill the interior of the clutch with the operation oil to reach an initial state of dynamic equilibrium, during which no operation oil will flow in or flow out the clutch. The drive shaft (not shown) transmits power to the housing 21 which in turn transmits the power to the eccentric cylinder ring 22 which is eccentricly and firmly connected therewith, and together they would affect an eccentric rotation. At this time, the barrel valve 26 is controlled by manipulating the axle housing 28, the operation oil in the plunger cavity 241 illustrated in the FIG. 8 is blocked such that the operation oil therein could not flow in or out, the plunger cannot effect reciprocating movement, and the thrust hoop and rotor is in an integrated and eccentric configuration, which makes the eccentric cylinder ring 22 and the thrust hoop 23 closely lean against each other. Then, the eccentric cylinder ring 22 could transmit power to the thrust hoop 23 and in turn to the driven shaft 30 so as to effect rotation in the same direction, whereby attaining the fully engaged state.

When the axle housing 28 is controlled and pushed to the left hand side of FIG. 8, namely, to be pushed inwardly along the axial direction, the operation oil blocked by the plunger cavity 241 and the barrel valve 26 will flow in and out in a proper rate, whereby generating different compression and expansion forces. This makes the thrust hoop and the rotor effect only a restricted reciprocating movement because of the plunger, such that a corresponding discrepancy is produced when the power is transmitted to the thrust hoop (including the plunger and rotor) during the rotation of the eccentric cylinder ring. As a result, different desired speeds could be maintained, and various engaged and disengaged states could be reached.

When the barrel valve 26 is controlled by the axle housing 28 to move, the operation oil in the plunger cavity 241 could directly flow in and out, the expansion and compression forces will be completely vanished, such that there is free of any mutual traction between the eccentric cylinder ring and the thrust hoop (including the plunger and rotor). At this point, the power of the drive shaft could not be transmitted to the driven shaft 30, whereby the fully disengaged state is reached.

When the plunger undergoes a high power oil taking process, the illustrated design of the configuration of the thrust hoop could not withstand the traction thereof, therefore, a ball valve 34 could be arranged at each plunger slot. During the oil taking process, the ball valve 34 will be opened automatically, which enables the oil to selectively flow through the control valve 26 and the ball valve 34, such that the traction subjected by the thrust hoop will be reduced and the entire structure could operate in a long lasting manner.

The material used in the embodiments is metals or high precision steel in general. The housing is sealed in a manner well known in the art. All elements are also connected in a manner well known by a person skilled in the art.

No doubt there are still further embodiments of the present invention. While a person skilled in the art could make various adaptive alterations and modifications based on the present invention without departing from the spirit and substance thereof, such alterations and modifications shall all fall into the scope of the claims accompanied herewith.

What is claimed is:

1. An eccentric gearing type clutch, comprising:
   a housing connected to, and for rotation with a drive shaft;
   at least one set of rotors, each set of rotors having two parallelly arranged rotors concentric with the housing and being connected to, and for rotation with, a driven shaft;
   at least one set of cylinder rings, each cylinder ring cooperating with a respective rotor, each set of cylinder rings having two cylinder rings arranged in parallel and located between the housing and respective rotors, and being capable of reciprocal radial displacement inside the housing, the two cylinder rings being separated by a separator plate;
   two vanes for each set of rotors, each vane of which is movably arranged in a respective slot in a respective rotor; and
   a joint control mechanism for controlling the reciprocal radial displacement of the two cylinder rings,
   wherein space inside the housing is filled with an operation oil and sealed.

2. The eccentric gearing type clutch according to claim 1, further comprising an elastic member arranged at one end of the housing for adjusting and balancing internal and external pressure of the housing.

3. The eccentric gearing type clutch according to claim 2, wherein the elastic member is an elastic synthetic rubber membrane.

4. The eccentric gearing type clutch according to claim 1, wherein a protecting cover having a through hole is arranged outside an elastic member.

5. The eccentric gearing type clutch according to claim 4, wherein the elastic member is an elastic synthetic rubber membrane.

6. The eccentric gearing type clutch according to claim 1, wherein each vane comprises an assembly for passage or blockage of the operation oil.

7. The eccentric gearing type clutch according to claim 6, wherein one end of each vane is in contact with a respective cylinder ring and has a curvature radius that is smaller than that of the cylinder ring.

8. The eccentric gearing type clutch according to claim 6, wherein the assembly for passage or blockage of the operation oil comprises a trough arranged at one side of each vane and a T-shaped conduit arranged in each vane which can communicate with the trough, wherein a ball is arranged in a transverse portion of the T-shaped conduit.

9. The eccentric gearing type clutch according to claim 8, wherein one end of each vane is in contact with a respective cylinder ring and has a curvature radius that is smaller than that of the cylinder ring.

10. The eccentric gearing type clutch according to claim 8, wherein one trough is arranged at each of two opposite sides of each vane.

11. The eccentric gearing type clutch according to claim 10, wherein one end of each vane is in contact with a respective cylinder ring and has a curvature radius that is smaller than that of the cylinder ring.

12. The eccentric gearing type clutch according to claim 1, wherein the joint control mechanism comprises a rocker arm; and a control lever connected to both of the cylinder rings, the control lever having one end connected with the rocker arm and another end mounted on an axle housing of the housing.

13. The eccentric gearing type clutch according to claim 1, further comprising a buffer oil passage formed with a plurality of interconnected conduits inside the housing.

14. An eccentric gearing type clutch, comprising:
a housing connected to, and for rotation with, a drive shaft;
a rotor concentric with the housing and connected to, and for rotation with, a driven shaft, the rotor having slots defined therein;
an eccentric cylinder ring eccentrically and fixedly connected with the housing;
a thrust hoop concentric with the eccentric cylinder ring and rotatable with respect to the eccentric cylinder ring;
at least three plungers equally and movably arranged in respective slots of the rotor; and
a control valve coaxially arranged in the rotor and axially movable in the rotor;
wherein space inside the housing is filled with an operation oil and sealed.

15. The eccentric gearing type clutch according to claim 14, further comprising an elastic member arranged at one end of the housing for adjusting and balancing internal and external pressure of the housing.

16. The eccentric gearing type clutch according to claim 15, wherein the elastic member is an elastic synthetic rubber membrane.

17. The eccentric gearing type clutch according to claim 15, wherein a protecting cover having a through hole is arranged outside the elastic member.

18. The eccentric gearing type clutch according to claim 17, wherein the elastic member is an elastic synthetic rubber membrane.

19. The eccentric gearing type clutch according to claim 14, wherein a ball valve is arranged at one end of each of the plungers.

20. The eccentric gearing type clutch according to claim 14, wherein the control valve has a barrel shape.

21. The eccentric gearing type clutch according to claim 20, wherein the control valve is connected with an axle housing fixed on the driven shaft by means of a jogger.

22. The eccentric gearing type clutch according to claim 14, wherein the control valve is connected with an axle housing fixed on the driven shaft by means of a jogger.

23. The eccentric gearing type clutch according to claim 14, wherein the number of the plungers ranges from 3 to 9.

24. The eccentric gearing type clutch according to claim 11, wherein the number of the plungers is 12.

* * * * *